(12) United States Patent
Shelby et al.

(10) Patent No.: US 10,129,601 B2
(45) Date of Patent: Nov. 13, 2018

(54) SHARED SPECTRUM ACCESS FOR BROADCAST AND BI-DIRECTIONAL, PACKET-SWITCHED COMMUNICATIONS

(71) Applicant: COHERENT LOGIX, INCORPORATED, Austin, TX (US)

(72) Inventors: Kevin A. Shelby, Austin, TX (US); Durga P. Prasad, Austin, TX (US); Sandeep Mavuduru Kannappa, Austin, TX (US); Mark Earnshaw, Kanata (CA)

(73) Assignee: Coherent Logix, Incorporated, Austin, TX (US)

( * ) Notice: Subject to any disclaimer, the term of this patent is extended or adjusted under 35 U.S.C. 154(b) by 0 days.

(21) Appl. No.: 14/822,603

(22) Filed: Aug. 10, 2015

(65) Prior Publication Data
US 2016/0057504 A1 Feb. 25, 2016

Related U.S. Application Data

(60) Provisional application No. 62/041,534, filed on Aug. 25, 2014.

(51) Int. Cl.
*H04N 5/00* (2011.01)
*H04N 19/00* (2014.01)
(Continued)

(52) U.S. Cl.
CPC ......... *H04N 21/6181* (2013.01); *H04N 21/23* (2013.01); *H04N 21/235* (2013.01); *H04N 21/262* (2013.01); *H04N 21/40* (2013.01); *H04N 21/41* (2013.01); *H04N 21/4126* (2013.01); *H04N 21/60* (2013.01); *H04N 21/61* (2013.01); *H04N 21/6112* (2013.01); *H04N 21/6131* (2013.01); *H04N 21/6137* (2013.01);
(Continued)

(58) Field of Classification Search
None
See application file for complete search history.

(56) References Cited

U.S. PATENT DOCUMENTS

| 8,867,501 B2 | 10/2014 | Wang | |
| 2002/0007490 A1* | 1/2002 | Jeffery | H04L 1/0003 725/78 |

(Continued)

FOREIGN PATENT DOCUMENTS

WO    WO 03/088510    10/2003

OTHER PUBLICATIONS

International Search Report for Application No. PCT/US2015/044524, dated Oct. 30, 2015 (4 pages).

*Primary Examiner* — Justin Shepard
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to spectrum sharing between different radio access technologies. In some embodiments, a broadcast base station is configured to wirelessly broadcast audio and video data to a plurality of broadcast receiver devices using a particular frequency band. In these embodiments, the broadcast base station is configured to discontinue broadcasting in the particular frequency band during a scheduled time interval, to enable one or more cellular base stations to perform bi-directional packet-switched wireless data communications using the particular frequency band.

22 Claims, 9 Drawing Sheets

(51) Int. Cl.
*H04N 21/00* (2011.01)
*H04N 21/61* (2011.01)
*H04N 21/262* (2011.01)
*H04N 21/41* (2011.01)
*H04W 72/00* (2009.01)
*H04W 72/04* (2009.01)
*H04W 72/12* (2009.01)
*H04W 4/06* (2009.01)
*H04N 21/235* (2011.01)
*H04N 21/63* (2011.01)
*H04N 21/60* (2011.01)
*H04N 21/23* (2011.01)
*H04N 21/637* (2011.01)
*H04N 21/633* (2011.01)
*H04N 21/40* (2011.01)
*H04W 88/06* (2009.01)

(52) U.S. Cl.
CPC ......... *H04N 21/6162* (2013.01); *H04N 21/63* (2013.01); *H04N 21/633* (2013.01); *H04N 21/637* (2013.01); *H04W 4/06* (2013.01); *H04W 72/00* (2013.01); *H04W 72/005* (2013.01); *H04W 72/0453* (2013.01); *H04W 72/12* (2013.01); *H04W 72/1215* (2013.01); *H04W 88/06* (2013.01)

(56) References Cited

U.S. PATENT DOCUMENTS

| | | | |
|---|---|---|---|
| 2008/0221951 A1* | 9/2008 | Stanforth | G06Q 10/063 705/7.41 |
| 2009/0013363 A1* | 1/2009 | Lee | H04H 20/24 725/110 |
| 2010/0056136 A1* | 3/2010 | Zhu | H04B 7/2606 455/426.1 |
| 2013/0072106 A1* | 3/2013 | Koskela | H04W 16/14 455/3.01 |
| 2013/0208587 A1* | 8/2013 | Bala | H04W 16/14 370/230 |
| 2013/0322279 A1* | 12/2013 | Chincholi | H04W 36/0088 370/252 |
| 2013/0336433 A1* | 12/2013 | Takahashi | H04N 5/4401 375/350 |
| 2014/0073335 A1* | 3/2014 | Panchal | H04W 4/00 455/450 |
| 2014/0120940 A1* | 5/2014 | Ren | H04W 16/14 455/454 |
| 2014/0328192 A1* | 11/2014 | Barriac | H04J 1/14 370/252 |
| 2015/0110012 A1* | 4/2015 | Bhushan | H04W 74/08 370/329 |

* cited by examiner

SHARED SPECTRUM ACCESS FOR BROADCAST AND BI-DIRECTIONAL, PACKET-SWITCHED COMMUNICATIONS

PRIORITY CLAIM

This application claims the benefit of U.S. Provisional Application No. 62/041,534, filed on Aug. 25, 2014, which is incorporated by reference herein in its entirety.

TECHNICAL FIELD

The present application relates to dynamic spectrum sharing for wireless communications.

DESCRIPTION OF THE RELATED ART

Wireless communication systems are rapidly growing in usage. Further, wireless communication technology has evolved from voice-only communications to also include the transmission of data, such as Internet and multimedia content. The proliferation of wireless communications may lead to a scarcity of frequency spectrum. Further, utilization of different portions of the spectrum may vary. For example, during some intervals cellular phone usage in a particular frequency band may be high. At the same time, broadcast television (TV) providers may not be utilizing all of their allotted frequency resources.

Thus, in some embodiments, techniques for dynamic spectrum sharing between different radio technologies may be desired.

SUMMARY

Techniques are disclosed relating to dynamic spectrum sharing. In some embodiments, a broadcast base station is configured to wirelessly broadcast audio and video data to multiple broadcast receiver devices using a particular frequency band. In these embodiments, the broadcast base station is configured to discontinue broadcasting in the particular frequency band during a scheduled time interval, to enable one or more cellular base stations to perform bi-directional packet-switched wireless data communications using the particular frequency band.

In some embodiments, a base station (e.g., a Long Term Evolution (LTE) base station) is configured to perform bi-directional packet-switched communication with one or more mobile devices using a first frequency band. In these embodiments, the base station is also configured to perform bi-directional packet-switched communication with one or more mobile devices using a second frequency band during a scheduled time interval, wherein the second frequency band is used for wirelessly broadcasting audio and video data to multiple devices during one or more time intervals other than the scheduled time interval.

In some embodiments, the disclosed techniques may allow for dynamic spectrum sharing between cellular and broadband communications. In some embodiments, a single base station is configured as both a broadcast base station and a cellular base station.

In some embodiments, mobile devices are configured to switch between frequency bands in order to take advantage of shared spectrum. In various embodiments, mobile devices may be configured to power down during blanking intervals for a corresponding radio technology (during which communications in the same spectrum by another radio technology may occur). In various embodiments, control signaling transmitted by cellular base stations and/or broadcast base stations may enable wireless receiver devices to maintain connectivity during dynamic spectrum sharing.

Figure 2:
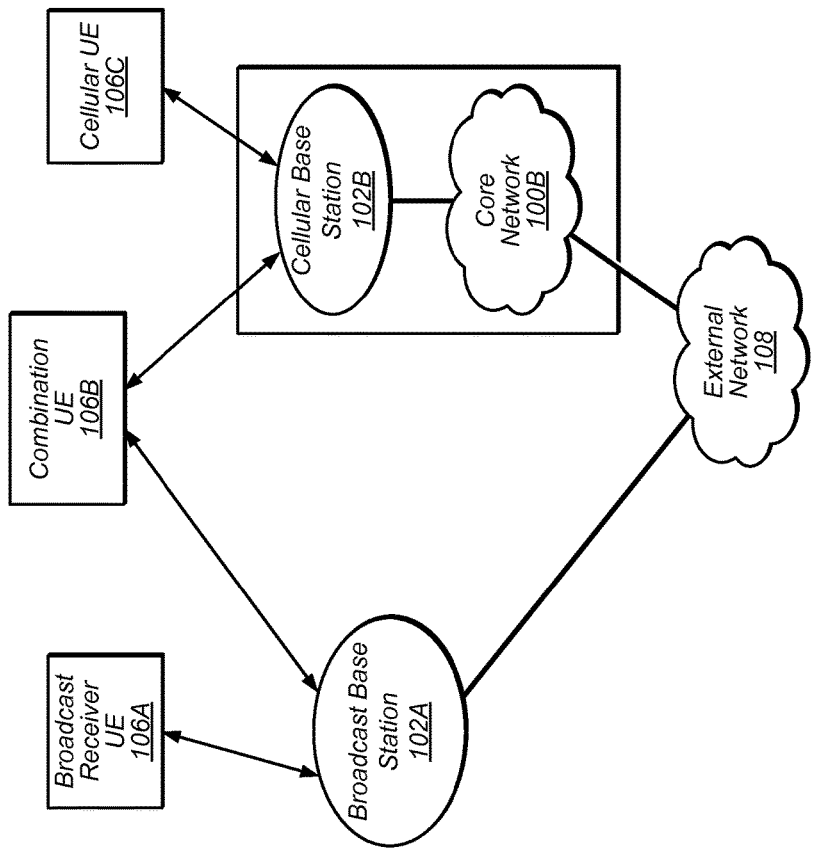
FIG. 2 is a block diagram illustrating an exemplary wireless communication environment that includes a broadcast base station and a cellular base station, according to some embodiments.

Although the embodiments above have been described in considerable detail, numerous variations and modifications will become apparent to those skilled in the art once the above disclosure is fully appreciated. It is intended that the following claims be interpreted to embrace all such variations and modifications.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Acronyms

The following acronyms are used in the present disclosure.
3GPP: Third Generation Partnership Project
ATSC: Advanced Television Systems Committee
CDMA: Code Division Multiple Access
GSM: Global System for Mobile Communications
LTE: Long Term Evolution NGBP: Next Generation Broadcast Platform
RAT: Radio Access Technology
RX: Receive
SIM: Subscriber Identity Module
TX: Transmit
UE: User Equipment
UMTS: Universal Mobile Telecommunications System Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
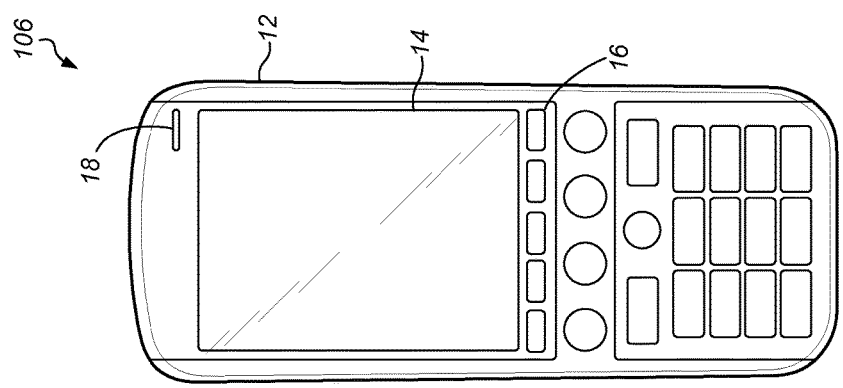
FIG. 1 is a diagram illustrating a user equipment device (UE), according to some embodiments.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as button 16, speaker port 18, and other elements (not shown), such as microphone, data port, and possibly various types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), and/or other RATs. For example, the UE 106 may support at least two radio access technologies such as LTE and GSM. Various different or other RATs may be supported as desired.

In some embodiments, UE 106 is also configured to receive broadcast radio transmissions which may convey audio and/or video content. In still other embodiments, a UE 106 may be configured to receive broadcast radio transmissions and may not be configured to perform bi-directional communications with a base station (e.g., UE 106 may be a television).

FIG. 2—Communication System and Spectrum Sharing Overview

FIG. 2 illustrates an exemplary (and simplified) wireless environment that includes multiple communication systems. In the illustrated embodiment, different UEs and broadcast receivers are configured to communicate via a broadcast network and/or a packet-switched cellular network. It is noted that the system of FIG. 2 is merely one example of possible systems, and embodiments may be implemented in any of various systems, as desired.

As shown, the exemplary wireless communication system includes base stations 102A and 102B which communicate over a transmission medium with one or more user equipment (UE) devices, represented as UEs 106A-106C.

Cellular base station 102B may be a base transceiver station (BTS) or cell site, and may include hardware that enables wireless communication with the UE 106B and UE 106C. In the illustrated embodiment, base station 102B is also configured to communicate with a core network 100B. Core network 100B may also be coupled to one or more external networks (such as external network 108), which may include the Internet, a Public Switched Telephone Network (PSTN), and/or any other network. Thus, the base station 102B may facilitate communication between the UE devices 106B and 106C and/or between the UE devices 106B and/or 106C and the networks 100B, and/or 108.

Base station 102B and other base stations operating according to the same or different RATs or cellular communication standards may be provided as a network of cells, which may provide continuous or nearly continuous overlapping service to UE 106B and/or UE 106C and similar devices over a wide geographic area via one or more radio access technologies (RATs).

Broadcast base station 102A may be configured to broadcast multimedia content (e.g., video and audio content for TV transmissions) to a plurality of receivers such as UEs 106A and 106B. In the illustrated embodiment, broadcast base station 102A is configured to communicate with external network 108. In various embodiments, broadcast base station 102A is also configured to communicate with one or more internal networks.

The term "broadcast" refers to one-to-many transmissions that are transmitted for receiving devices in a broadcast area rather than being addressed to a particular device. Further, broadcast transmissions are typically one-directional (from transmitter to receiver). In some situations, control signaling (e.g., ratings information) may be passed back to a broadcast transmitter from the receivers, but the content data is transmitted in only one direction. In contrast, cellular communication is typically bi-directional. "Cellular" communications also may involve handoff between cells. For example, when UE 106C (and/or UE 106B) moves out of the cell served by cellular base station 102B, it may be handed over to another cellular base station (and the handover may be handled by the network, including operations performed by base station 102B and the other cellular base station). In contrast, when a user moves from the range covered by a first broadcast base station to the range covered by a second broadcast base station, it may switch to receiving content from the second broadcast base station, but the base stations do not need to facilitate handover (e.g., they simply continue broadcasting and do not care which base station a particular UE is using).

Traditionally, broadcast transmissions are performed using different frequency resources than cellular transmissions. In some embodiments, however, frequency resources are shared between these different types of transmissions. For example, in some embodiments, broadcast base station 102A is configured to relinquish one or more frequency bands during scheduled time intervals for use by cellular base station 102B for packet-switched communications.

Dynamic spectrum sharing gives rise to the potential for explicit coordination between networks to ensure seamless end user connectivity. Dynamic spectrum sharing may provide means for a broadcast operator to derive additional revenue by temporarily relinquishing use of its spectrum holdings, in part or in whole, to a wireless carrier, e.g., under expressed written agreement between the respective network operators. A configurable base station, versed in the complement of underlying signaling protocols, may facilitate uninterrupted connectivity from end user devices seeking either broadcast or broadband service access (or both) at a given point in time.

In some embodiments, control signaling transmitted by a broadcast or cellular base station may allow end user devices to maintain full signaling connectivity (which may eliminate network churn), extend battery life (e.g., by determining when to remain in a low power mode when a base station is not transmitting), and/or actively manage coverage detection (e.g., rather than perceiving spectrum sharing periods as spotty coverage or a temporary network outage).

Different levels of coordination may be utilized in various embodiments. In some embodiments, a broadcast operator may relinquish its spectrum to a cellular operator for a scheduled time period with no intervening signaling to the broadcast receiver. In these embodiments, the broadcast network is inaccessible for the duration of the deferral period, leaving its receivers unaware of network status until broadcast services resume. This may be referred to as unilateral deferral. In some embodiments, the cellular operator may periodically blank its transmission to enable the broadcast operator to transmit control signaling informing broadcast receivers of its dormant period. This may notify broadcast receivers of blanking periods, but may not allow them to continue receiving broadcast data. This may be referred to as joint deferral. In some embodiments, the broadcast and cellular providers may fully coordinate and allow UEs and broadcast receivers to maintain uninterrupted connectivity to their respective networks. For example, control signaling for broadcast transmissions may include sufficient synchronization information to allow broadcast receivers to receive broadcast content in active intervals (e.g., intervals between broadcast blanking intervals during which cellular data is transmitted). This may involve superimposing cellular synchronization and cell configuration parameters with broadcast frame parameters, in some embodiments.

The base stations 102A and 102B and the UEs 106A, 106B, and 106C may be configured to communicate over the transmission medium using any of various RATs (also referred to as wireless communication technologies or telecommunication standards), such as LTE, Next Generation Broadcast Platform (NGBP), W-CDMA, TDS-CDMA, and GSM, among possible others such as UMTS, LTE-A, CDMA2000 (e.g., 1xRTT, 1xEV-DO, HRPD, eHRPD), Advanced Television Systems Committee (ATSC) standards, Digital Video Broadcasting (DVB), etc.

Broadcast and cellular networks are discussed herein to facilitate illustration, but these technologies are not intended to limit the scope of the present disclosure and the disclosed spectrum sharing techniques may be used between any of various types of wireless networks, in other embodiments.

Figure 3:
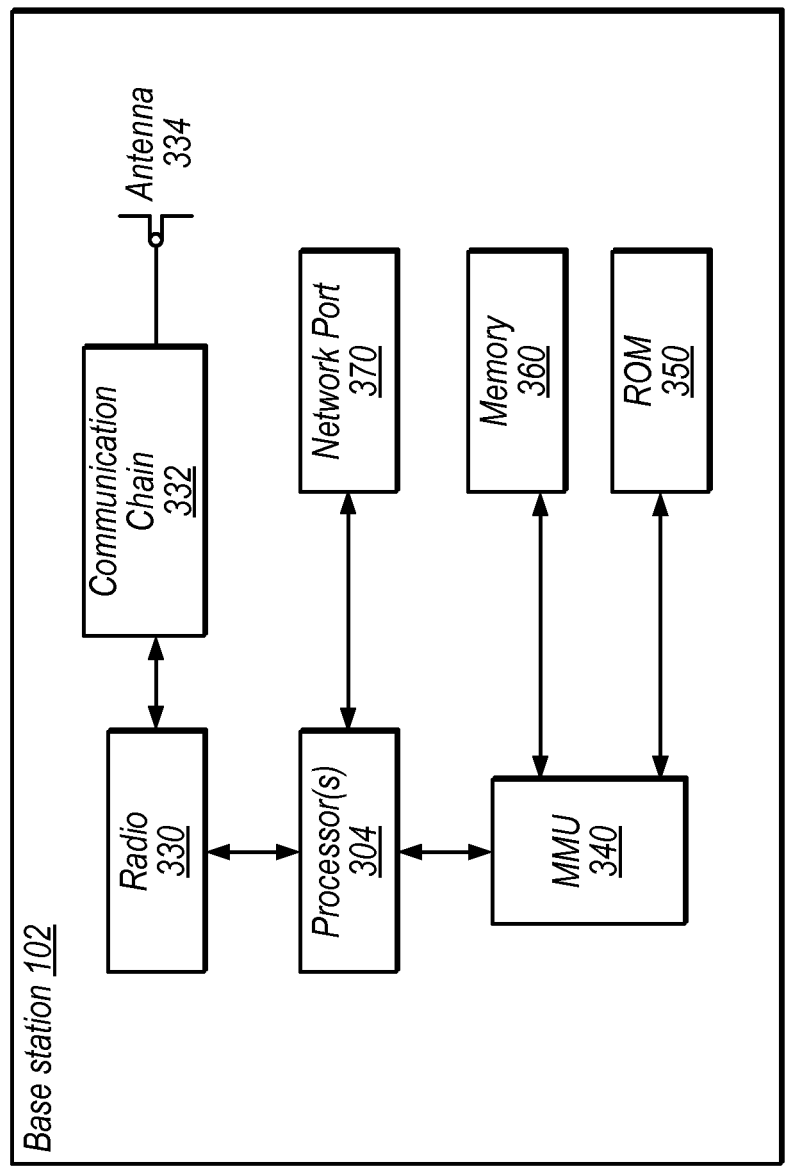
FIG. 3 is a block diagram illustrating an exemplary base station, according to some embodiments.

FIG. 3—Base Station

FIG. 3 illustrates an exemplary block diagram of a base station 102. In some embodiments, base station 102 may be a broadcast base station such as base station 102A of FIG. 2 and/or a cellular base station such as base station 102B of FIG. 2. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above. In some embodiments, the network port 370 (or an additional network port) may be coupled to a television network and configured to receive content for broadcasting. The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332 in the illustrated embodiment. Communication chain 332 may be a receive chain, a transmit chain or both. The radio 330 may be configured to communicate via various RATs.

The processor(s) 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

In some embodiments, base station 102 is configured to perform both broadcast and bi-directional packet-switched communications. In these embodiments, base station 102 may include multiple radios 330, communication chains 332, and/or antennas 334, for example. In other embodiments, the disclosed spectrum sharing techniques may be performed by different base stations configured to perform only broadcast transmissions or only packet-switched communications.

Figure 4:
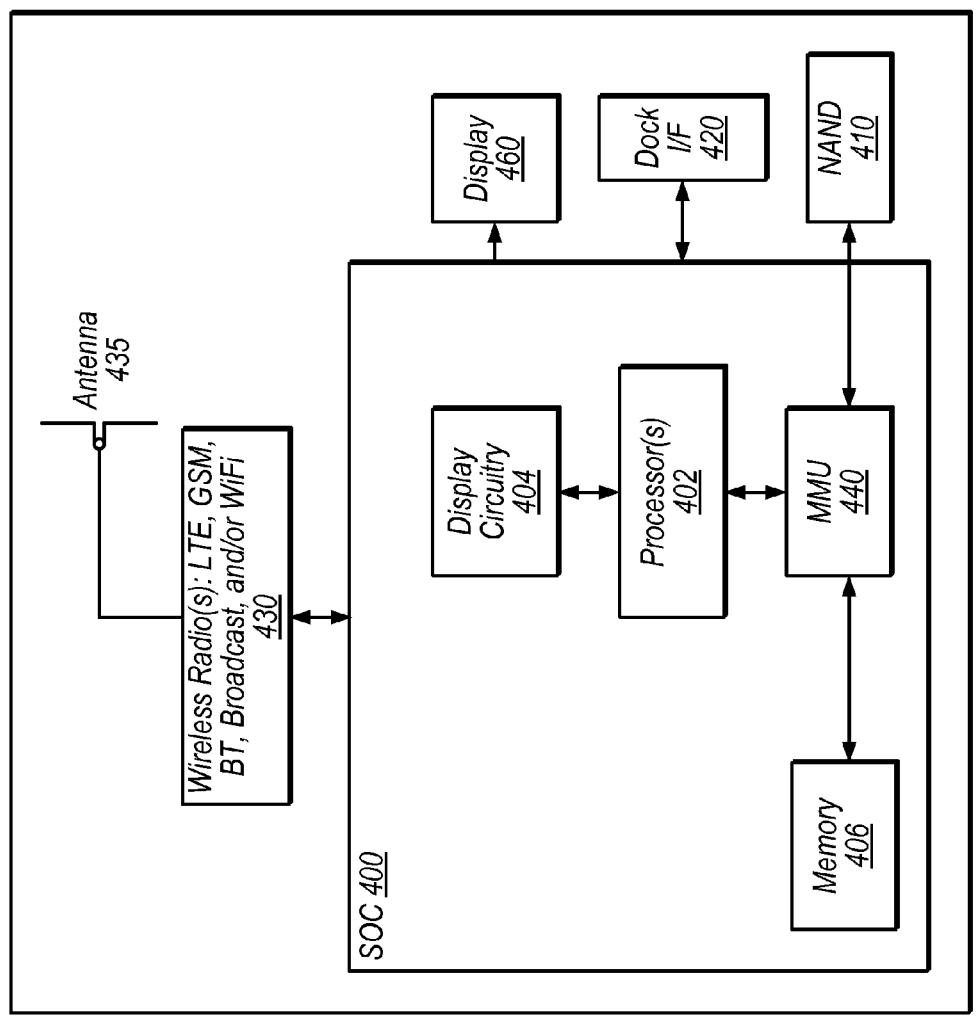
FIG. 4 is a block diagram illustrating an exemplary UE, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, wireless communication circuitry 430 such as for LTE, GSM, Bluetooth, WLAN, and/or broadcast, etc. The UE 106 may further comprise one or more smart cards that implement SIM (Subscriber Identity Module) functionality. The wireless communication circuitry 430 may couple to one or more antennas, such as antenna 435.

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

In some embodiments (not shown), UE 106 is configured to receive wireless broadcasts, e.g., from broadcast base station 102A of FIG. 2. In these embodiments, 106 may include a broadcast radio receiver. In some embodiments, UE 106 is configured to receive broadcast data and perform packet-switched cellular communications (e.g., LTE) at the same time using different frequency bands and/or the same frequency resources during different time slices. This may allow users to view TV broadcasts while performing other tasks such as browsing the internet (e.g., in a split-screen mode), using web applications, or listening to streaming audio. In other embodiments, the disclosed techniques may be used in systems with devices that are configured as broadcast receivers or for cellular communications, but not both.

The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
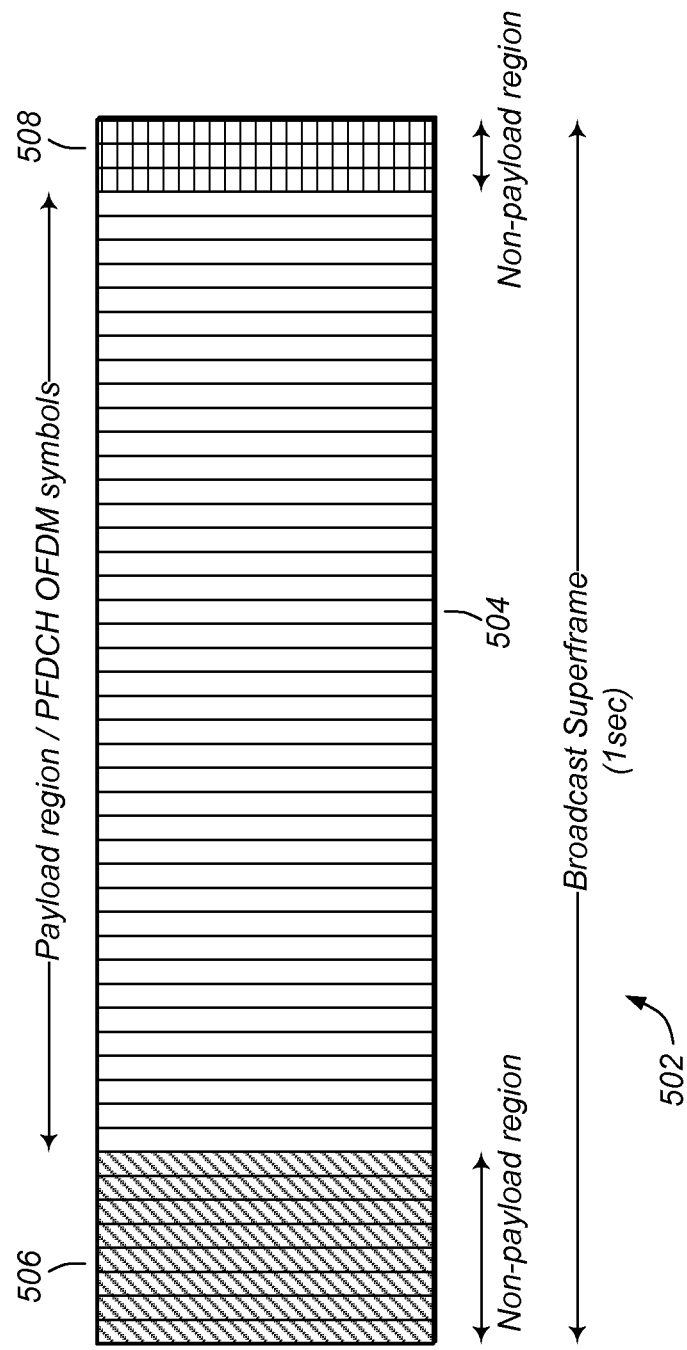
FIG. 5 is a diagram illustrating an exemplary broadcast frame, according to some embodiments.

FIG. 5—Exemplary Broadcast Frame

FIG. 5 illustrates a generalized broadcast super-frame structure 502, according to some embodiments. In the illustrated embodiment, the super-frame occupies a 1-second duration that is independent of underlying frame configuration. In some embodiments, this fixed duration may facilitate coordination with a cellular network transport layer. The illustrated super-frame 502 includes a payload region 504 which carries actual payload data, and zero or more non-payload regions 506 and 508 which may carry control or other signaling information. In the example shown, separate non-payload regions 506 and 508 are indicated by the shaded areas at the beginning and end of the frame 502. The relative lengths in time (horizontal axis) and numbers of symbols for each region may not be shown to scale in this example diagram.

In some embodiments, the initial non-payload region 506 serves as a preamble that provides initial synchronization and frame configuration to receiver devices. In some embodiments, detection of a particular preamble may set the context by which the remaining preamble symbols are to be detected. For example, if base station 102A relinquishes a portion of its spectrum to LTE, it may indicate a separate context signaled in the broadcast preamble as "private". In some embodiments, other fields may indicate various information to receiving devices, e.g. how long the transport will be occupied and the bandwidth of the signal. For example, a broadcast receiver device may use this information to determine when to begin monitoring for broadcast data again. A cellular device may use this information to determine how long it can transmit data in a borrowed frequency band. In some embodiments, broadcast receivers are configured to ignore super-frames that belong to a service context other than that which the broadcast device is equipped to receive.

Figure 6:
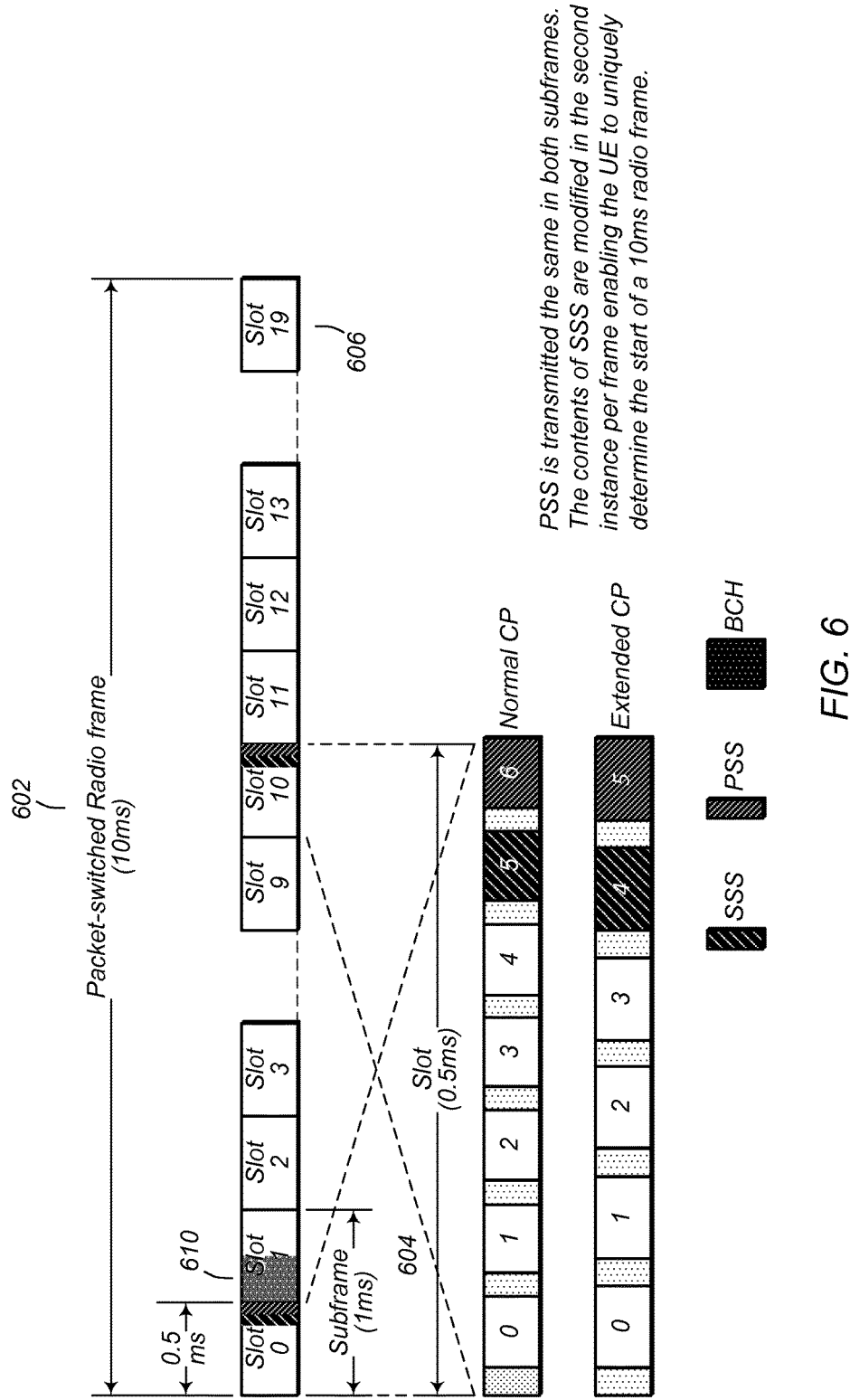
FIG. 6 is a diagram illustrating an exemplary LTE radio frame, according to some embodiments.

FIG. 6—Exemplary Cellular Frame

FIG. 6 illustrates an exemplary cellular radio frame (an LTE frame in the illustrated example). In the illustrated embodiment, a cellular radio frame 602 comprises multiple subframes 604. In the illustrated embodiment, each subframe is 1 ms in length and is composed of two 0.5 ms slots 606. The illustrated frame may be used for bi-directional, packet-switched cellular communications, in various embodiments.

Primary and secondary synchronization signals, PSS and SSS, are inserted in subframes 0 and 5 in slots 0 and 10, in the illustrated embodiment. PSS may be transmitted identically in both subframes. The SSS contents may be modified in the second instance per frame, which may enable the UE to uniquely determine the start of a 10 ms radio frame. In some embodiments, PSS and SSS are immediately followed by a physical broadcast channel (BCH) 610 only in the first subframe of a radio frame. The BCH may convey frame configuration to the broadband receiver. Note that the term "broadcast" in the context of BCH refers to control signaling that is distributed equally to receivers within an LTE cell and is thus different than broadcast data content distributed by a broadcast base station.

Figure 7:
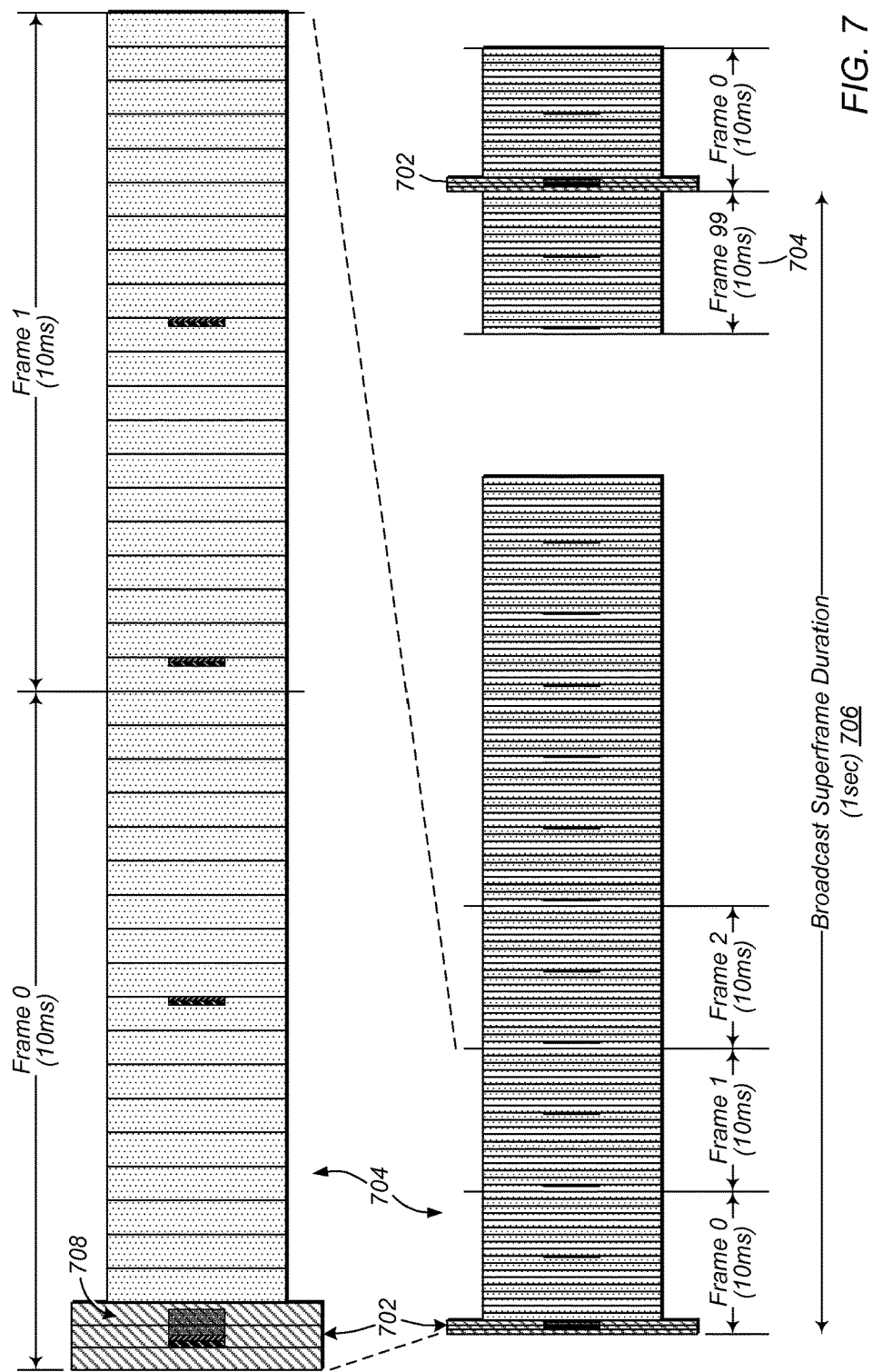
FIG. 7 is a diagram illustrating exemplary control signaling for spectrum sharing between LTE and broadband transmissions, according to some embodiments.

FIG. 7—Exemplary Signaling Structures for Coordination of Spectrum Sharing

FIG. 7 illustrates incorporation of universal signaling into an LTE frame structure. In various embodiments, control signaling may be used to indicate time intervals during which frequency bands will be available. This may signal to broadcast and broadband receivers alike the intended use of spectrum resources in any given frame period.

In the illustrated embodiment, a preamble 702 is transmitted in the first LTE subframe 704 corresponding to the start of the broadcast super-frame duration 706. In some embodiments, this may require synchronization of the broadcast super-frames with LTE frames (e.g., the super-frame should begin at the same time as an LTE frame, in some embodiments). Preamble 702 may be a "hybrid" preamble in the sense that both broadcast and cellular control signaling is transmitted by the respective networks during the preamble interval. This signaling may be transmitted using different time and/or frequency resources to avoid interference, in some embodiments.

In some embodiments, the broadcast portion of preamble 702 contains initial synchronization information plus any additional configuration parameters the broadband provider wishes to advertise in the broadcast cell. In some embodiments, the first broadcast symbol is sent as it would be in a normal broadcast mode, which may ensure robust signal detection. In the illustrated embodiment, the remaining symbols transmitted from the broadband base station are modified (e.g., by blanking at least a portion of the frequency spectrum during these intervals) as needed to accommodate signaling fields destined for the cellular receiver, e.g. PSS, SSS and BCH, enabling continued network connectivity despite the presence of the surrounding broadcast signaling.

Thus, in some embodiments, broadcast symbols overlapping the broadband signaling fields 708 are notched to accommodate PSS, SSS and BCH. In some embodiments, these cellular fields nominally occupy 72 subcarriers surrounding the center carrier at 15 kHz subcarrier spacing (1.080 MHz). In these embodiments, the broadcast base station 102A may zero out the equivalent signal bandwidth to avoid compromising the integrity of the cellular signaling fields.

Further, cellular base station 102B may suspend scheduling of user data in subframe zero as it overlaps the broadcast preamble 702. The data loss in subframes available for user data scheduling ($\frac{1}{1000}^{th}$ in the illustrated embodiment) may be inexpensive relative to the ability to share frequency spectrum with the broadcast base station 102A. Normal cellular data scheduling may resume after subframe zero for the remainder of the super-frame duration.

In some embodiments, a single base station (e.g., a base station configured for both broadcast and cellular transmissions) may be configured to transmit the entire preamble 702. Further, in some embodiments, a cellular base station may be configured to transmit a portion of the broadcast control signaling and/or vice versa, to facilitate scheduling.

Exemplary Spectrum Sharing Between LTE and NGBP

In some embodiments, a configurable eNB is configured to transmit both NGBP (broadcast) and EUTRA (Evolved Universal Terrestrial Radio Access) (LTE, Long Term Evolution) (cellular) signals using similar bandwidths in the same frequency spectrum by time interleaving the two signals. Maintaining correct time alignment between the NGBP and EUTRA signals may be relatively simple if the same base station (eNB, evolved Node B) is transmitting both signals. In these embodiments, an eNB may transmit a single signal, portions of which correspond to the NGBP waveform while other portions of the signal correspond to the EUTRA waveform. In other embodiments, (e.g., embodiments in which different base stations are configured as broadcast-only or cellular-only) coordination between the different networks may be needed for the time alignment.

The embodiments discussed below utilize NGBP and LTE for illustrative purposes, but similar techniques may be used for other broadcast and/or cellular protocols (such as NGBP, GSM, etc.) or may be used for protocols that are not broadcast or cellular in nature in other embodiments.

In some embodiments, MBSFN (Multicast/Broadcast Single Frequency Network) subframes may be used by the cellular network for blanking to leave spectrum for broadcast transmissions. In these embodiments, a EUTRA downlink signal may be configured with MBSFN subframes. In FDD (Frequency Division Duplex) EUTRA systems, subframes 1, 2, 3 and 6, 7, 8 of each 10 ms EUTRA radio frame may be configured as MBSFN subframes. MBSFN subframes may have the property that an EUTRA signal need only be transmitted in the first 1 or 2 OFDM (Orthogonal Frequency Division Multiplexing) symbols of a 1 ms subframe, while the remaining 13 or 12 OFDM symbols respectively may be left blank with no signal being transmitted. In particular, no EUTRA reference symbols need be transmitted in the OFDM symbols belonging to the MBSFN region of an MBSFN subframe. This implies that a blank area with a time length of 0.857 ms (12 OFDM symbols) or 0.929 ms (13 OFDM symbols) may exist in each MBSFN subframe.

Assuming an example sampling rate of 12.288 Msps (Mega samples per second) for the NGBP signal, MBSFN subframes with this blank area correspond to approximately 10500 or 11400 samples available for NGBP use in the blank areas of the MBSFN subframes for blank areas of length 12 or 13 OFDM symbols, respectively. (Note that this is an example sampling rate, and higher sampling rates for NGBP have also been proposed and could be selected in a dynamic fashion.) For example, this set of samples is sufficient for either two NGBP OFDM symbols using a 4096 FFT (Fast Fourier Transform) or one NGBP OFDM symbol using an 8192 FFT, plus an appropriately-sized cyclic prefix.

An NGBP frame may be configured with multiple partitions, which may be referred to as Physical Partition Data CHannels (PPDCH). Exemplary techniques for forming broadcast frame payloads with multiple PPDCHs are discussed in U.S. patent application Ser. No. 14/805,004 "Multi-Partition Radio Frames," which was filed Jul. 21, 2015 and is incorporated by reference herein in its entirety. For time interleaving NGBP and EUTRA signals, one or more PPDCHs may be configured to carry the NGBP data during the blank areas of the EUTRA MBSFN subframes, while one or more blanking PPDCHs may be configured to correspond to the active portions of the EUTRA signals. These latter NGBP PPDCHs may be configured such that no NGBP signal is transmitted during those PPDCHs (including suppressing any NGBP reference symbols), so as not to interfere with the EUTRA signal. In some embodiments, broadcast base station 102A is configured to inform NGBP receivers that NGBP reference symbols will not be transmitted during blank partitions, and the NGBP receivers may take this information into account while performing channel estimation.

The disclosed techniques may be implemented using LTE time division duplex (TDD) radio frames, LTE frequency division duplex (FDD) radio frames, and/or other types of radio frames in various embodiments or situations. Depending on the configuration of the cellular radio frames used, signaling information may be transmitted during different time and/or frequency portions of the cellular frames.

Figure 8:
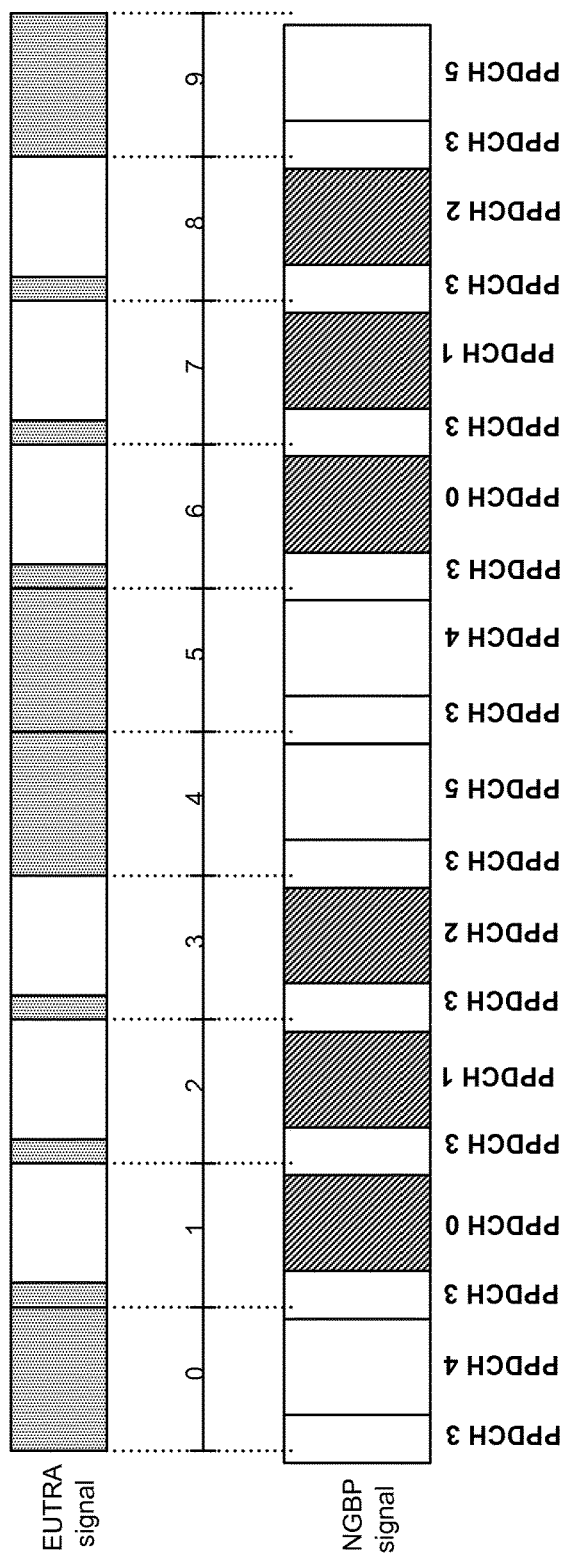
FIG. 8 is a diagram illustrating exemplary blanking periods of LTE and broadcast transmissions for spectrum sharing, according to some embodiments.

FIG. 8 is a signal diagram illustrating an exemplary time interleaving between broadcast and cellular transmissions, according to some embodiments. This example uses a sampling rate of 12.288 Msps for NGBP, but various sampling rates may be used as appropriate. Note that while FIG. 8 shows a particular frequency band, broadcast transmissions may or may not continue on other frequency bands during relinquishment of the illustrated band.

In the illustrated example, PPDCHs 0, 1, and 2 carry NGBP broadcast data. In this example, each of these PPDCHs is configured to use an FFT size of 4096, with a cyclic prefix length of 512 samples. This results in a total of 9216 samples for two consecutive OFDM symbols, which fits within the blank area of an EUTRA MBSFN subframe, in the illustrated embodiment. (Alternatively, one OFDM symbol with an FFT size of 8192 and a cyclic prefix length of 1024 samples may be used for the same total length of 9216 samples.) In this example, PPDCH 0 has a periodicity of 5 ms to cover MBSFN subframes 1 and 6, PPDCH 1 has a periodicity of 5 ms to cover MBSFN subframes 2 and 7, and PPDCH 2 has a periodicity of 5 ms to cover MBSFN subframes 3 and 8.

In the illustrated example, PPDCH 3 is a blank partition that corresponds to the initial portion of each MBSFN subframe (which carries an active EUTRA signal). A 1 ms EUTRA subframe corresponds to 12288 NGBP samples during the same time period. Of these samples, 9216 are assigned to PPDCH 0, 1, or 2, depending upon the actual subframe index in question. This leaves 3072 samples for PPDCH 3, which may therefore be configured to use OFDM symbols with an FFT size of 2048 and a cyclic prefix length of 1024 samples, for example. PPDCH 3 may have a periodicity of 1 ms to cover the initial portion of each subframe (as well as a small part of the final portion of the preceding subframe, in this example).

In the illustrated example, PPDCH 4 and 5 are blank partitions that correspond to the active EUTRA portions of non-MBSFN subframes 0, 4, 5, and 9. These two partitions may use the same configurations as data-carrying partitions 0, 1, 2 (i.e. two OFDM symbols with an FFT size of 4096 and a cyclic prefix length of 512 samples or one OFDM symbol with an FFT size of 8192 and a cyclic prefix length of 1024 samples, and a periodicity of 5 ms).

In the illustrated embodiment, shaded areas represent an active transmission for the corresponding waveform, while unshaded areas represent no active transmission for the corresponding waveform. As can be seen from the diagram, the active portions of the NGBP signal (PPDCHs 0, 1, and 2) fall within the non-active portions of the EUTRA signal (the MBSFN portions of EUTRA subframes 1, 2, 3 and 6, 7, 8) (and vice versa), so that there is no collision between the two waveforms.

The following table summarizes the exemplary NGBP PPDCH configurations corresponding to FIG. 8.

| Quantity | PPDCH 0 | PPDCH 1 | PPDCH 2 | PPDCH 3 | PPDCH 4 | PPDCH 5 |
| --- | --- | --- | --- | --- | --- | --- |
| FFT size | 8192 | 8192 | 8192 | 2048 | 8192 | 8192 |
| Cyclic prefix length | 1024 | 1024 | 1024 | 1024 | 1024 | 1024 |
| Absolute index of first OFDM symbol | 3 | 5 | 7 | 0 | 1 | 9 |
| OFDM symbol periodicity | 10 | 10 | 10 | 2 | 10 | 10 |

In some embodiments, the control signaling transmitted in (e.g., in a preamble at the beginning of) an NGBP frame may correspond to multiple LTE subframes. For example, the length of the PFCCH (Physical Format Control CHannel) and PCCCH (Physical Content Control CHannel), both of which are discussed in the '004 Patent Application, together may likely interfere with several of the EUTRA subframes. This may happen only once per NGBP frame, however, e.g., once per second. Further, in some embodiments the PFCCH and PCCCH locations are time-aligned with MBSFN subframes to minimize impact on EUTRA user devices. In some embodiments, the cellular base station 102B is configured to avoid scheduling transmissions to EUTRA devices during any overlap period with the NGBP PFCCH and PCCCH in order to reduce potential signal collisions. Finally, in some embodiments, a particular preamble value for the PFCCH may be used to signal the NGBP receivers that the PCCCH format is a special format (e.g. with some time gaps to avoid interfering with non-MBSFN subframes) rather than a normal NGBP signal.

In embodiments in which a single base station is configured to transmit both EUTRA and NGBP signals, these signals may occupy the same (or similar) bandwidths with the same carrier frequency, which may avoid RF issues such as needing to retune the radio to a different frequency when switching between the two signals. In other embodiments, the signals may occupy different, overlapping bandwidths and/or use different carrier frequencies.

Exemplary Spectrum Sharing Embodiments for Local/Regional Broadcasts

In some embodiments, spectrum sharing techniques may be used to share spectrum between broadcasts of local content and broadcast of regional content (where regional content refers to content intended for a larger area than the local content). In some embodiments, a single base station is configured to transmit both types of content, and is configured to transmit the local content in some partitions of a broadcast frame and the regional content in other partitions of a broadcast frame. In these embodiments, the local/regional content may also be targeted for particular types of devices, e.g., mobile devices, fixed devices, etc.

In other embodiments, a regional broadcast base and one or more local broadcast base stations may be configured to share spectrum. For example, the regional broadcast base station may be configured to blank partitions corresponding to transmissions by the one or more local base stations. In these embodiments, the base stations may communicate to coordinate synchronization of broadcast frames and/or to configure which base stations transmit or blank during which intervals.

In some embodiments, time slices for use of spectrum in the same frequency band may be allocated to: local broadcast content, regional broadcast content, and bi-directional packet-switched communications.

Exemplary Coordination Schemes for Spectrum Sharing

In some embodiments, spectrum may be allocated using an exchange over which broadcast providers can list spectrum that they are willing to relinquish and cellular providers can purchase use of the listed spectrum. Broadcast providers may list particular percentages of the time that they are willing to relinquish spectrum (e.g., based on the size of partitions in broadcast frames that they are willing to blank), particular intervals during which they are willing to relinquish spectrum, etc. In some embodiments, the exchange may also allow providers to coordinate frame synchronization and configuration of which base stations are configured to blank during what time intervals.

In some embodiments, a centralized system is configured to determine and indicate spectrum sharing configurations, but is not configured to do so via an exchange. In some embodiments, decisions on how to share spectrum may be made in a distributed manner. For example, a broadcast base station may determine its spectrum usage based on current programming and communicate its ability to relinquish spectrum to nearby cellular base stations. The nearby base stations (e.g., stations with overlapping coverage areas) may then coordinate spectrum sharing parameters among themselves in a de-centralized manner. These communications between broadcast and/or cellular base stations may or may not be performed wirelessly. In some embodiments, fields for such communications may be added to cellular and/or broadcast frame structures.

Figures 9, 10:
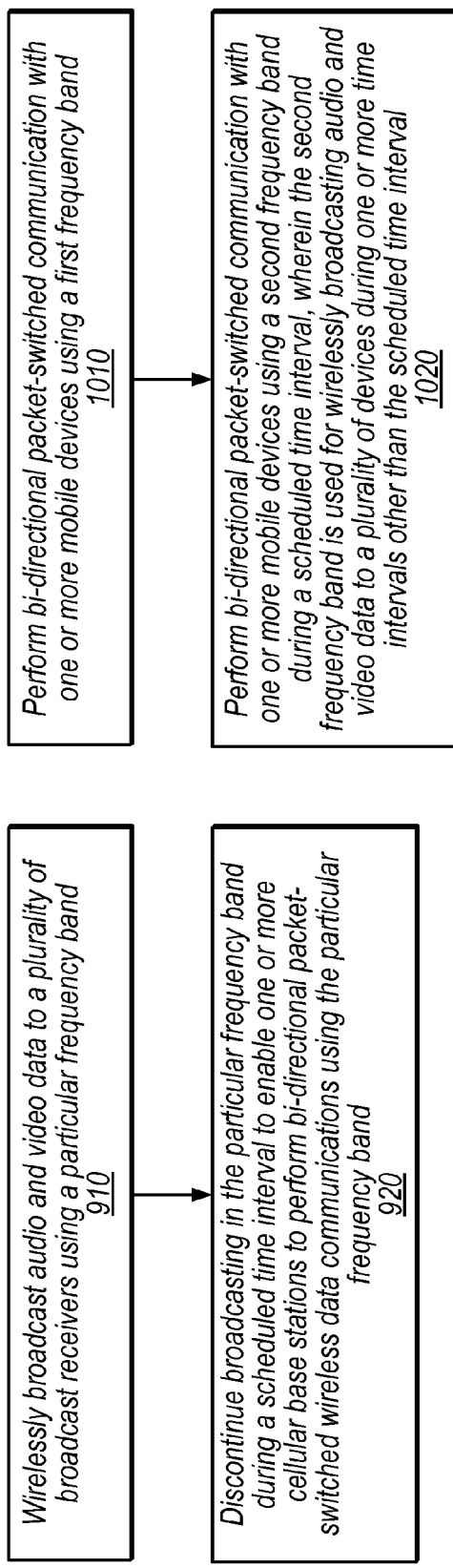
FIG. 9 is a flow diagram illustrating a method for operating a broadcast base station, according to some embodiments.
FIG. 10 is a flow diagram illustrating a method for operating a cellular base station, according to some embodiments.
Figure 11:
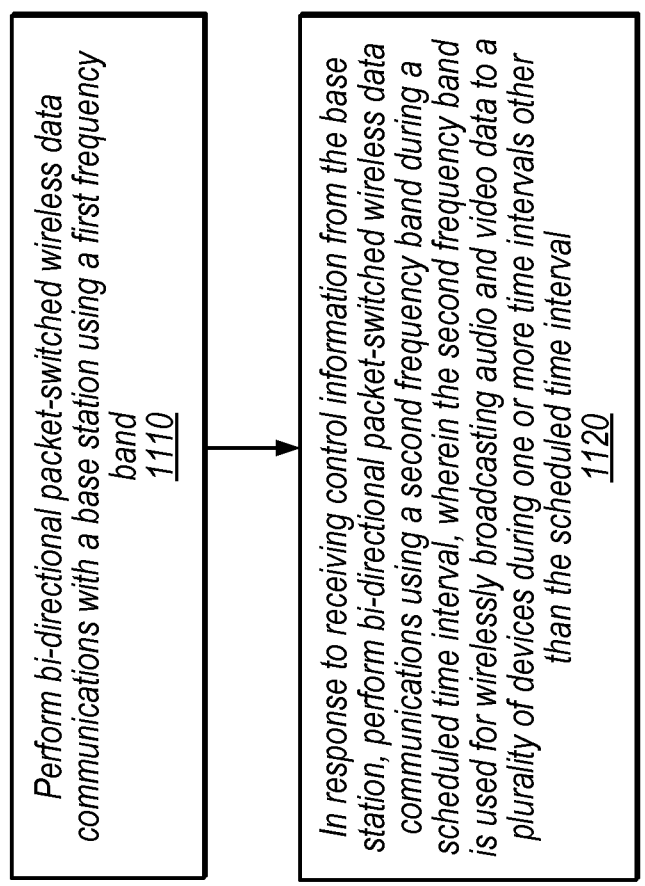
FIG. 11 is a flow diagram illustrating a method for operating a UE, according to some embodiments.

FIGS. 9-11—Exemplary Methods

Turning now to FIG. 9, a flow diagram illustrating one exemplary embodiment of a method for operating a broadcast base station is shown. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, broadcast base station 102A wirelessly broadcasts audio and video data to a plurality of broadcast receivers using a particular frequency band. In some embodiments, this may be a portion of the UHF band, which ranges from 470 to 884 MHz. In other embodiments, any of various frequency bands may be utilized.

At 920, broadcast base station 102A discontinues broadcasting on the particular frequency band during a scheduled time interval to enable one or more cellular base stations (e.g., cellular base stations 10B) to perform bi-directional packet-switched wireless data communications using the particular frequency band. In some situations, the particular frequency band may be only a portion of the spectrum in which the broadcast base station is configured to transmit while in other situations the broadcast base station may relinquish its entire spectrum. As shown in FIG. 8, in some embodiments the scheduled time interval may correspond to a portion of a 1 ms LTE sub frame.

In some embodiments, the base station is configured to transmit on the particular frequency band during other scheduled time intervals, e.g., during other subframes of a particular LTE frame. In some embodiments, the base station is configured to transmit control signaling to receiving user devices and the control signaling indicates time intervals during which the broadcast base station will blank transmissions.

Turning now to FIG. 10, a flow diagram illustrating one exemplary embodiment of a method for operating a cellular base station is shown. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1010, cellular base station 102B performs bi-directional packet-switched communication with one or more mobile devices using a first frequency band. The first frequency band may be a band assigned to a cellular provider associated with base station 102B for cellular communications.

At 1020, cellular base station 102B performs communication with one or more mobile devices using a second frequency band during a scheduled time interval. In the illustrated embodiment, the second frequency band is used for wirelessly broadcasting audio and video data to a plurality of devices during one or more time intervals other than the scheduled time interval. For example, the second frequency band may be assigned to a broadcast provider associated with broadcast base station 102A. The broadband provider may agree, however, not to use at least a portion of its spectrum during the scheduled time interval. In some embodiments, cellular base station 102B may include multiple radios configured to communicate using the different first and second frequency bands. The cellular base station 102B may notify UEs to communicate via the second frequency band during the scheduled time interval.

Turning now to FIG. 11, a flow diagram illustrating one exemplary embodiment of a method for operating a UE is shown. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1110, a UE performs bi-directional packet-switched wireless data communications with a base station using a first frequency band. In some embodiments, this may be performed within a cellular frequency band, which may vary from country to country, but are often specified in bands of 10 to 100 MHz between 700 MHz and 3600 MHz.

At 1120, the UE, in response to receiving control signaling from the base station, performs bi-directional packet-switched wireless data communications using a second frequency band during a scheduled time interval. In the illustrated embodiment, the second frequency band is used for wirelessly broadcasting audio and video data to a plurality of devices during one or more time intervals other than the scheduled time interval. This may allow the UE to communicate using frequency bands normally reserved for broadcast transmissions, which may increase data rates, reduce power consumption, increase battery life, etc., relative to communicating in a congested frequency band.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE, a broadcast receiver, or a base station) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The processor may be a central processing unit (CPU) or a digital signal processor (DSP), for example. The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A broadcast base station, comprising:
   at least one radio transmitter;
   one or more processors coupled to the at least one radio transmitter;
   wherein the broadcast base station is configured to:
   wirelessly broadcast a common set of audio and video data to a plurality of broadcast receiver devices using a particular frequency band, wherein the broadcast base station is not configured to receive content data from any of the broadcast receiver devices;
   discontinue broadcasting in the particular frequency band during a scheduled time interval, to enable one or more cellular base stations to perform bi-directional packet-switched wireless data communications using the particular frequency band;
   transmit control signaling during a pre-determined portion of the scheduled time interval, wherein the control signaling includes synchronization information to enable one or more broadcast receiver devices to remain connected to the broadcast base station during the scheduled time interval such that the receiver devices remain synchronized with the broadcast base station at the end of the scheduled time interval; and
   resume broadcasting in the particular frequency band after the scheduled time interval and after use of the particular frequency band by one or more cellular base stations performing bi-directional packet-switched wireless data communications using the particular frequency band.

2. The broadcast base station of claim 1, wherein the broadcast base station is configured to discontinue broadcasting in the particular frequency band based on information indicating that one or more cellular base stations will utilize the particular frequency band during the scheduled time interval.

3. The broadcast base station of claim 1, wherein the broadcast base station is configured to align a broadcast frame boundary with a boundary for cellular frames transmitted by the one or more cellular base stations and configured to transmit the control signaling using a pre-determined portion of the cellular frame based on the alignment.

4. The broadcast base station of claim 1, wherein the scheduled time interval corresponds to a portion of a frame of bi-directional packet-switched wireless data communications data transmitted by the one or more cellular base stations.

5. The broadcast base station of claim 4, wherein the broadcast base station is configured to wirelessly broadcast audio and video data during another portion of the frame.

6. The broadcast base station of claim 5, wherein the other portion of the frame corresponds to a multicast/broadcast single frequency network (MBSFN) subframe.

7. The broadcast base station of claim 1, wherein the broadcast base station is configured to transmit blanking information indicating the scheduled time interval to receiving devices of the broadcast audio and video data.

8. A method, comprising:
   wirelessly broadcasting a common set of audio and video data, by a broadcast base station, to a plurality of broadcast receiver devices using a particular frequency band, wherein the broadcast base station is not configured to receive content data from any of the receiver devices;
   discontinuing broadcasting in the particular frequency band, by the broadcast base station, during a scheduled time interval, to enable one or more cellular base stations to perform bi-directional packet-switched wireless data communications using the particular frequency band;
   transmitting, by the broadcast base station, control signaling during a pre-determined portion of the scheduled time interval, wherein the control signaling includes synchronization information to enable one or more broadcast receiver devices to remain connected to the broadcast base station during the scheduled time interval such that the receiver devices remain synchronized with the broadcast base station at the end of the scheduled time interval; and resume broadcasting in the particular frequency band, by the broadcast base station, after the scheduled time interval and after use of the particular frequency band by one or more cellular base stations performing bi-directional packet-switched wireless data communications using the particular frequency band.

9. The method of claim 8, wherein the packet-switched wireless data communications are Long Term Evolution (LTE) communications.

10. The method of claim 8, further comprising:

the broadcast base station aligning frames of broadcast data with a boundary of frames transmitted by the one or more cellular base stations; and the broadcast base station receiving scheduling information indicating the scheduled time interval;

wherein the scheduled time interval corresponds to a portion of a frame of bi-directional packet-switched wireless data communications data transmitted by the one or more cellular base stations.

11. A mobile device, comprising:

at least one antenna;

one or more radios; and one or more processing elements;

wherein the mobile device is configured to:

perform bi-directional packet-switched wireless data communications with a base station using a first frequency band;

in response to receiving control signaling from the base station, perform bi-directional packet-switched wireless data communications using a second frequency band during a scheduled time interval, wherein the second frequency band is used for wirelessly broadcasting a common set of audio and video data to a plurality of devices, by a broadcast base station that is not configured to receive content data from any of the plurality of devices, during a time interval prior to the scheduled time interval and a time interval subsequent to the scheduled time interval; and receive cellular control information that includes synchronization information in the second frequency band outside of the scheduled time interval and remain connected to and synchronized with the base station for communications using the second frequency band during one or more broadcast intervals outside of the scheduled time interval, based on the received cellular control information.

12. The mobile device of claim 11, wherein the mobile device is further configured to:

receive broadcast audio and video data during at least one of the prior and subsequent time intervals.

13. The mobile device of claim 11, wherein the scheduled time interval corresponds to a portion of a frame of packet-switched wireless data communications.

14. The mobile device of claim 13, wherein the mobile device is configured to receive broadcast audio and video data during a portion of a multicast/broadcast single frequency network (MBSFN) subframe.

15. The mobile device of claim 11, wherein the scheduled time interval corresponds to a portion of a subframe of packet-switched wireless data communications.

16. A non-transitory computer-readable medium having instructions stored thereon that are executable by a mobile computing device to perform operations comprising:

performing bi-directional packet-switched wireless data communications with a base station using a first frequency band; and in response to receiving control signaling from the base station, performing bi-directional packet-switched wireless data communications on a second frequency band during a scheduled time interval, wherein the second frequency band is used for wirelessly broadcasting a common set of audio and video data to a plurality of devices, by a broadcast base station that is not configured to receive content data from any of the plurality of devices, during a time interval prior to the scheduled time interval and a time interval subsequent to the scheduled time interval; and receiving cellular control information that includes synchronization information in the second frequency band outside of the scheduled time interval and remaining connected to and synchronized with the base station for communications using the second frequency band during one or more broadcast intervals outside of the scheduled time interval, based on the received cellular control information.

17. The non-transitory computer-readable medium of claim 16, wherein the performing bi-directional packet-switched wireless data communications using the first frequency band and the performing bi-directional packet-switched wireless data communications using the second frequency band are performed via different base stations.

18. The non-transitory computer-readable medium of claim 16, wherein the scheduled time interval corresponds to a portion of a frame of packet-switched wireless data communications.

19. A base station, comprising:

at least one radio transmitter;

one or more processors coupled to the at least one radio transmitter;

wherein the base station is configured to:

perform bi-directional packet-switched communication with one or more mobile devices using a first frequency band; and perform bi-directional packet-switched communication with one or more mobile devices using a second frequency band during a scheduled time interval, wherein the second frequency band is used for wirelessly broadcasting a common set of audio and video data to a plurality of devices, by a broadcast base station that is not configured to receive content data from any of the plurality of devices, during a time interval prior to the scheduled time interval and a time interval subsequent to the scheduled time interval; and transmit cellular control information that includes synchronization information for the second frequency band outside of the scheduled time interval to enable one or more cellular devices to remain synchronized with and connected to the base station outside of the scheduled time interval.

20. The base station of claim 19, wherein the base station is configured to align wireless frames for the bi-directional packet-switched communication with broadcast frames corresponding to the wirelessly broadcasting audio and video data.

21. The base station of claim 19, wherein the scheduled time interval corresponds to a subframe of bi-directional packet-switched wireless data communication.

22. A method, comprising:
- performing, by a cellular base station, bi-directional packet-switched communication with one or more mobile devices using a first frequency band; and
- performing, by the cellular base station, bi-directional packet-switched communication with one or more mobile devices using a second frequency band during a scheduled time interval, wherein the second frequency band is used for wirelessly broadcasting a common set of audio and video data to a plurality of devices, by a broadcast base station that is not configured to receive content data from any of the plurality of devices, during a time interval prior to the scheduled time interval and a time interval subsequent to the scheduled time interval; and
- transmitting cellular control information that includes synchronization information for the second frequency band outside of the scheduled time interval to enable one or more cellular devices to remain synchronized with and connected to the cellular base station outside of the scheduled time interval.

\* \* \* \* \*